(12) United States Patent
Togami et al.

(10) Patent No.: US 8,814,229 B2
(45) Date of Patent: Aug. 26, 2014

(54) LATCHING MECHANISM FOR AN ELECTRONIC MODULE

(75) Inventors: Chris Kiyoshi Togami, San Jose, CA (US); Gary Dean Sasser, San Jose, CA (US); Joshua John Edward Moore, Collingwood (CA)

(73) Assignee: Finisar Corporation, Sunnyvale, CA (US)

( * ) Notice: Subject to any disclaimer, the term of this patent is extended or adjusted under 35 U.S.C. 154(b) by 866 days.

(21) Appl. No.: 12/771,421

(22) Filed: Apr. 30, 2010

(65) Prior Publication Data

US 2011/0267742 A1 Nov. 3, 2011

(51) Int. Cl.
E05C 3/12 (2006.01)
E05C 3/16 (2006.01)
H05K 5/00 (2006.01)
H05K 7/00 (2006.01)
G06F 1/16 (2006.01)
G02B 6/38 (2006.01)

(52) U.S. Cl.
USPC ............ 292/219; 292/220; 385/55; 385/56; 385/76; 385/77; 361/679.01; 361/679.58

(58) Field of Classification Search
USPC ......... 292/57, 58, 95, 96, 121, 122, 219, 220; 361/679.58; 385/55, 56, 77
See application file for complete search history.

(56) References Cited

U.S. PATENT DOCUMENTS

| 1,417,391 | A | * | 5/1922 | Kuczkowski | 292/220 |
|---|---|---|---|---|---|
| 1,937,978 | A | * | 12/1933 | Miller | 292/127 |
| 4,765,662 | A | * | 8/1988 | Suska | 292/92 |
| 6,081,647 | A | | 6/2000 | Roth et al. | |
| 6,371,795 | B1 | * | 4/2002 | Yamamoto et al. | 439/468 |
| 7,114,984 | B2 | | 10/2006 | Shirk et al. | |
| 7,347,633 | B2 | * | 3/2008 | Minota | 385/92 |
| 7,841,779 | B1 | * | 11/2010 | Bianchini et al. | 385/88 |
| 7,866,712 | B2 | * | 1/2011 | Kintz | 292/121 |
| 2003/0142917 | A1 | * | 7/2003 | Merrick | 385/53 |
| 2004/0091214 | A1 | | 5/2004 | Finona | |
| 2004/0161958 | A1 | * | 8/2004 | Togami et al. | 439/160 |
| 2005/0208822 | A1 | * | 9/2005 | Ishigami et al. | 439/372 |
| 2006/0103140 | A1 | * | 5/2006 | Bella et al. | 292/95 |
| 2006/0103141 | A1 | * | 5/2006 | Schlack et al. | 292/139 |
| 2007/0237489 | A1 | * | 10/2007 | Sasser et al. | 385/147 |

OTHER PUBLICATIONS

International Search Report dated Feb. 21, 2012 as received in application No. PCT/US2011/034664.
Written Opinion of the International Searching Authority dated Feb. 21, 2012 as received in International Application No. PCT/US2011/034664.

* cited by examiner

*Primary Examiner* — Kristina Fulton
*Assistant Examiner* — Faria Ahmad
(74) *Attorney, Agent, or Firm* — Maschoff Brennan

(57) ABSTRACT

Latching mechanisms for electronic modules. In one example embodiment, a latching mechanism for an electronic module includes a latch, a latch return spring, and a release slide. The latch is configured to rotate between a latched position and an unlatched position. The latch includes a latch arm on a first end of the latch and an engagement pin on a second end of the latch. The latch return spring is configured to bias the latch in the latched position. The release slide includes a slide ramp. The slide ramp is configured to engage the latch arm as the release slide is slid away from the engagement pin, which causes the latch to rotate from the latched position to the unlatched position.

15 Claims, 10 Drawing Sheets

LATCHING MECHANISM FOR AN ELECTRONIC MODULE

BACKGROUND

Electronic modules, such as transceiver or transponder modules configured to transmit and receive electrical or optical data signals, are increasingly used in electronic and optoelectronic communication. Some modules are pluggable, which permits the module to be inserted and removed from a receptacle of a host device, such as a host computer, switching hub, network router, or switch box. Some host devices include multiple receptacles and can therefore accommodate multiple modules simultaneously. Each module typically communicates with a printed circuit board of the host device by transmitting and/or receiving electrical signals to and/or from the host device printed circuit board. These electrical signals can also be transmitted by the module outside the host device as optical and/or electrical signals.

In order for a module to be pluggable, various latching mechanisms have been developed to secure modules within host device receptacles and to release modules from within host device receptacles. One such latching mechanism requires the use of a separate extraction tool to retrieve a module from a host device receptacle. Use of a separate extraction tool can be undesirable because an extraction tool can raise costs, can be misplaced, and may not be compatible with other module designs and/or mechanism designs.

Other latching mechanisms require that the leading edge of the receptacle of a host device be flexible in order to enable the corresponding module to be inserted into and/or extracted from the receptacle. These mechanisms can be undesirable because a receptacle with a flexible leading edge can sometimes allow an undesirable amount of electromagnetic radiation to be unintentionally emitted from the receptacle, which can cause electromagnetic interference in surrounding electronic devices.

BRIEF SUMMARY OF SOME EXAMPLE EMBODIMENTS

In general, example embodiments of the invention relate to latching mechanisms for use in selectively securing a module within a receptacle of a host device. The example latching mechanisms disclosed herein assist in both the selective retention of the module within a receptacle of a host device as well as removal therefrom when desired. For example, in at least one example embodiment, the latching mechanism is configured so as to retract its engagement pin when a handle of the latching mechanism is pulled, thus facilitating removal of the module from a receptacle of a host device. Also, in at least one example embodiment, the latching mechanism is configured so as to automatically reengage its engagement pin when the handle of the latching mechanism is released, thus facilitating retention of the module with a receptacle of a host device. Moreover, in at least one example embodiment, the latching mechanism is configured so as to retract its engagement pin without pulling on the handle of the latching mechanism so as to prevent malfunction as the module is inserted into a receptacle with a substantially rigid leading edge. Further, in at least one example embodiment, the handle of the latching mechanism facilitates relatively easy insertion and extraction of a module, even in high density host devices.

In one example embodiment, a latching mechanism for an electronic module includes a latch, a latch return spring, and a release slide. The latch is configured to rotate between a latched position and an unlatched position. The latch includes a latch arm on a first end of the latch and an engagement pin on a second end of the latch. The latch return spring is configured to bias the latch in the latched position. The release slide includes a slide ramp. The slide ramp is configured to engage the latch arm as the release slide is slid away from the engagement pin, which causes the latch to rotate from the latched position to the unlatched position.

In another example embodiment, an electronic module includes a shell and a latching mechanism. The shell defines a cross bar. The latching mechanism includes a latch and a release slide. The latch is configured to rotate about the cross bar between a latched position and an unlatched position. The latch includes a latch arm on a first end of the latch and an engagement pin on a second end of the latch. The release slide includes a slide ramp. The slide ramp is configured to slide along the latch arm as the release slide is slid away from the engagement pin, which causes the latch to rotate from the latched position to the unlatched position.

In yet another example embodiment, an electronic module includes a shell and a latching mechanism. The shell defines a cross bar. The latching mechanism includes a latch, a latch return spring, a release slide, first and second slide springs, and a handle. The latch is configured to rotate about the cross bar between a latched position and an unlatched position. The latch includes first and second latch arms defined on a first end of the latch and an engagement pin defined on a second end of the latch. The latch return spring is configured to bias against the first end of the latch to maintain the latch in the latched position. The release slide includes first and second slide ramps. The first and second slide ramps are configured to engage the first and second latch arms, respectively, as the release slide is slid away from the engagement pin, which causes the latch to rotate from the latched position to the unlatched position. The first and second slide springs are configured to bias the release slide toward the engagement pin. The handle is attached to the release slide. The handle is configured to be manually pulled in order to slide the release slide away from the engagement pin.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments of the invention relate to latching mechanisms for use in selectively securing a module within a receptacle of a host device. The example latching mechanisms disclosed herein assist in both the selective retention of the module within a receptacle of a host device as well as removal therefrom when desired. For example, in at least one example embodiment, the latching mechanism is configured so as to retract its engagement pin when a handle of the latching mechanism is pulled, thus facilitating removal of the module from a receptacle of a host device. Also, in at least one example embodiment, the latching mechanism is configured so as to automatically reengage its engagement pin when the handle of the latching mechanism is released, thus facilitating retention of the module with a receptacle of a host device. Moreover, in at least one example embodiment, the latching mechanism is configured so as to retract its engagement pin without pulling on the handle of the latching mechanism so as to prevent malfunction as the module is inserted into a receptacle with a substantially rigid leading edge. Further, in at least one example embodiment, the handle of the latching mechanism facilitates relatively easy insertion and extraction of a module, even in high density host devices.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. Example Electronic Module

Figure 1A:
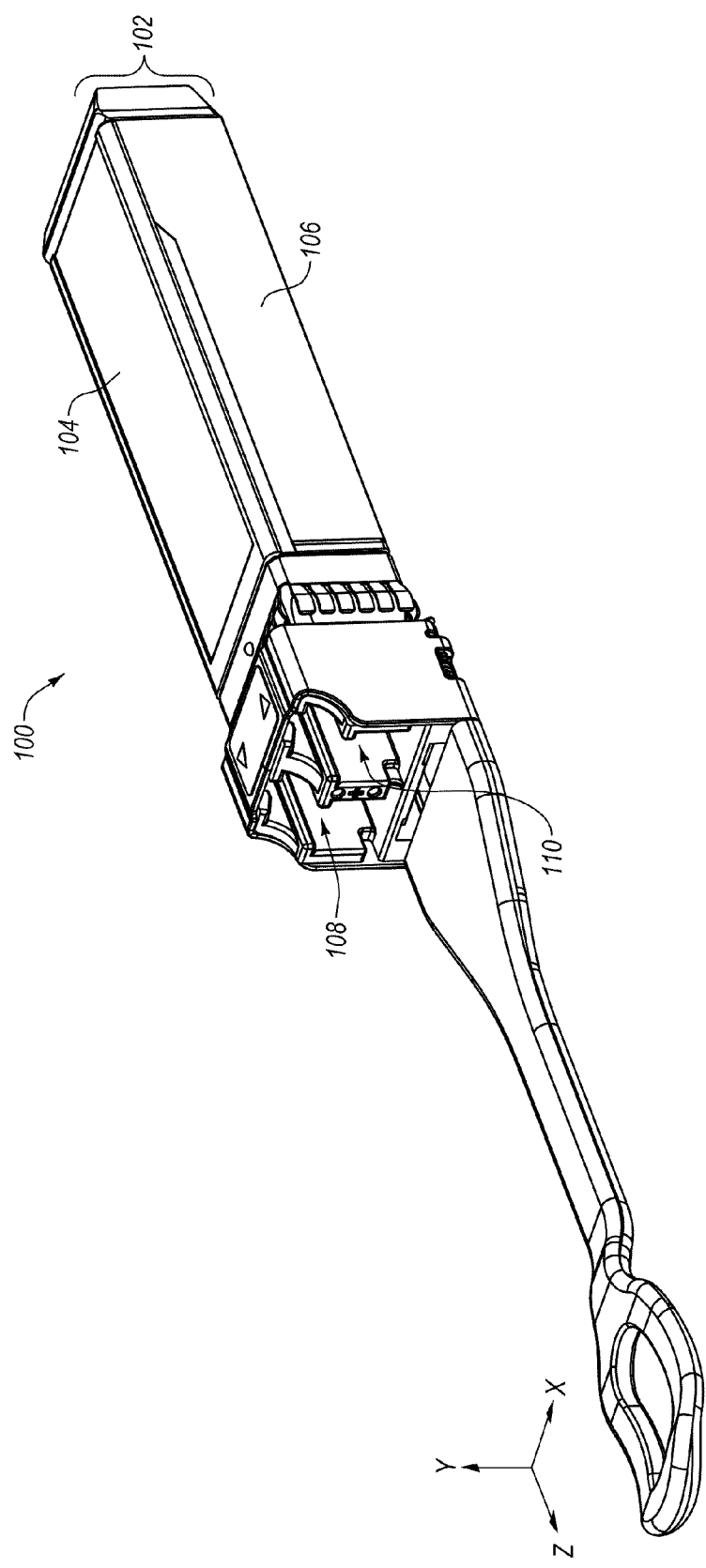
FIG. 1A is a top front perspective view of an example electronic module.
Figure 1B:
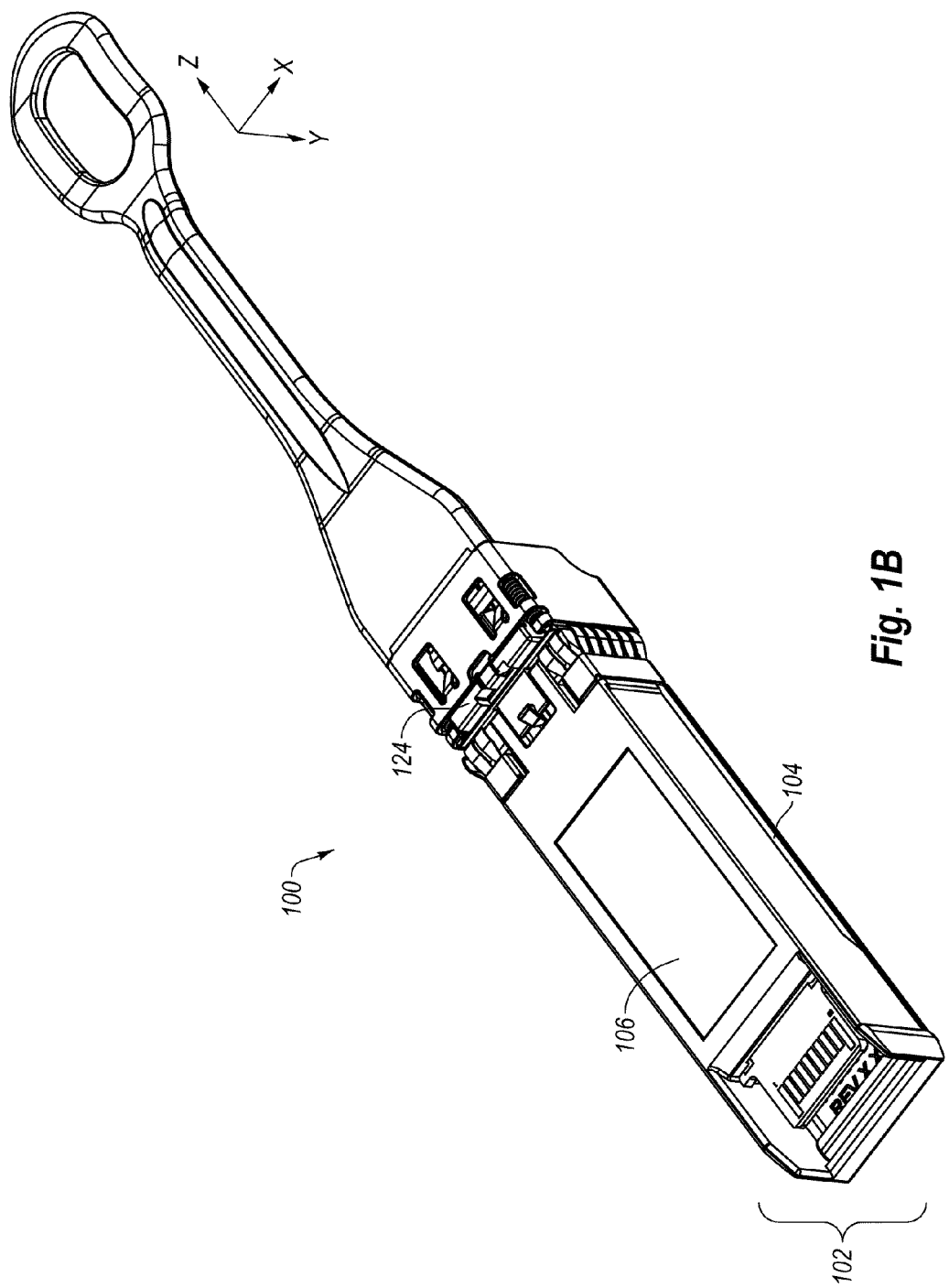
FIG. 1B is a bottom rear perspective view of the example electronic module of FIG. 1A.
Figure 1C:
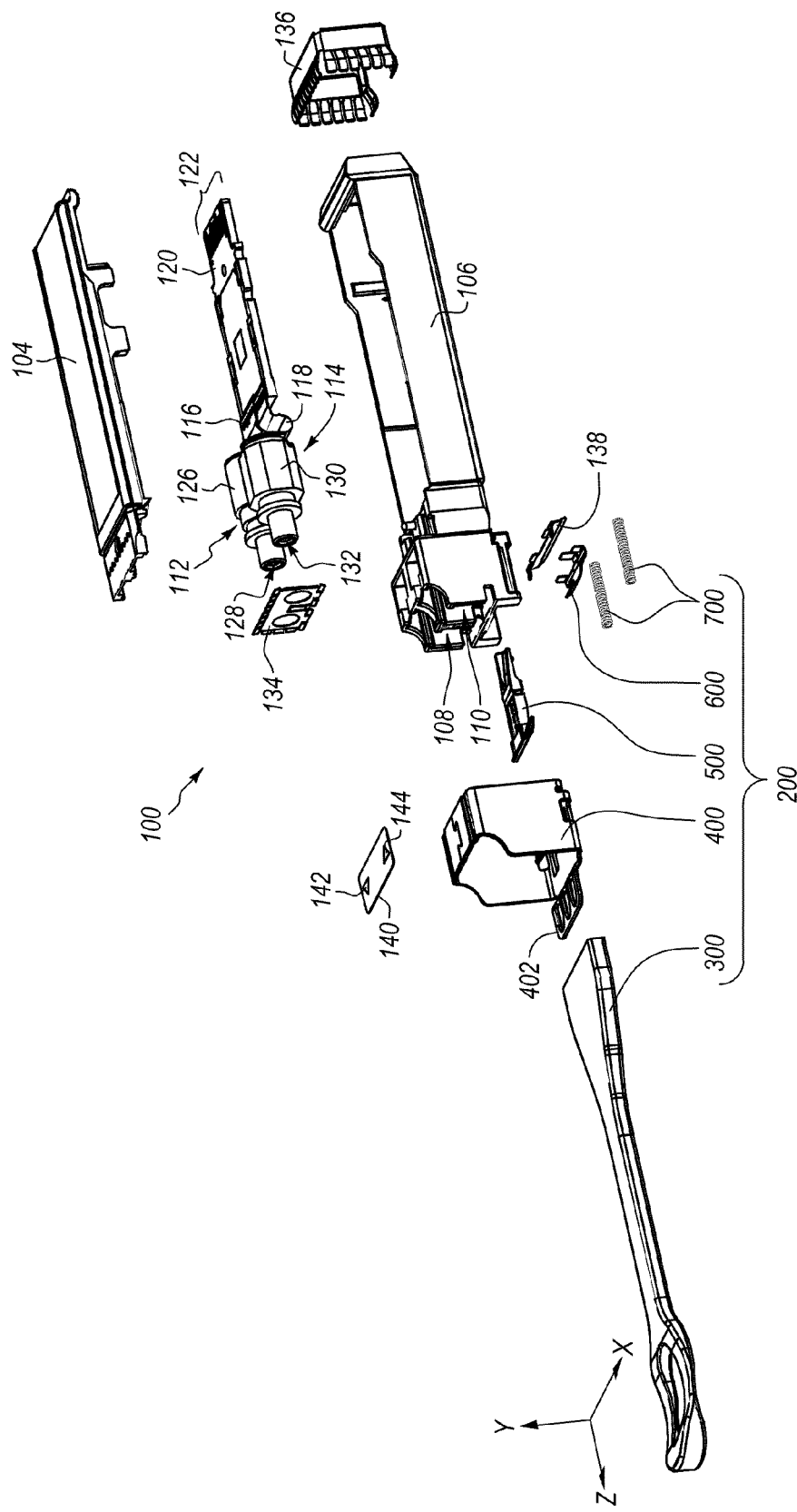
FIG. 1C is an exploded top front perspective view of the example electronic module of FIG. 1A and an example latching mechanism.

Reference is first made to FIGS. 1A-1C which disclose an example module 100 for use in transmitting/receiving optical signals that are converted from/to electrical signals that are transmitted to/received from a host device (not shown). As disclosed in FIGS. 1A and/or 1B, the module 100 includes various components, including a shell 102 that includes a top shell 104 and a bottom shell 106, and an output port 108 and an input port 110 defined in the bottom shell 106. The top shell 104 and the bottom shell 106 can be formed using a die casting process. One example material from which the top shell 104 and the bottom shell 106 can be die cast is zinc, although the top shell 104 and the bottom shell 106 may alternatively be die cast, injection molded, machined, or otherwise manufactured from other suitable materials.

As disclosed in FIG. 1C, the example module 100 also includes a transmitter optical subassembly ("TOSA") 112, a receiver optical subassembly ("ROSA") 114, electrical interfaces 116 and 118, and a printed circuit board ("PCB") 120 having an edge connector 122. The two electrical interfaces 116 and 118 are used to electrically connect the TOSA 112 and the ROSA 114, respectively, to the PCB 120. As disclosed in FIG. 1B, the bottom shell 106 also includes a cross bar 124 which will be discussed in further detail below in connection with FIGS. 3A-3C and 4A-4C.

As disclosed in FIG. 1C, the TOSA 112 of the module 100 includes a barrel 126 within which an optical transmitter, such as a laser, (not shown) is positioned. The optical transmitter is configured to convert electrical signals received through the PCB 120 from a host device (not shown) into corresponding optical signals. The TOSA 112 also includes a port 128. The port 128 is configured to optically connect the optical transmitter positioned within the barrel 126 with a fiber-ferrule (not shown) positioned within the output port 108.

Similarly, the ROSA 114 of the module 100 includes a barrel 130 and a port 132. The port 132 is configured to optically connect an optical receiver, such as a photodiode (not shown), positioned within the barrel 130 to a fiber-ferrule (not shown) positioned within the input port 110. The optical receiver is configured to convert optical signals received from the fiber-ferrule into corresponding electrical signals for transmission to a host device (not shown) through the PCB 120.

As disclosed in FIG. 1C, the module 100 further includes an optical subassembly ("OSA") positioning plate 134, a collar clip 136, an electromagnetic radiation ("EMR") shield 138, and a decal 140. The example OSA positioning plate 134 can help secure the TOSA 112 and the ROSA 114 in an accurate x, y, and z optical alignment with the output port 108 and the input port 110, respectively. In addition, the OSA positioning plate 134 can help solve problems associated with gaps that result from manufacturing tolerances of the top shell 104, the bottom shell 106, the TOSA 112, and the ROSA 114. The example collar clip 136 can secure the top shell 104 to the bottom shell 106 and thus eliminate the need for a screw or other fastener(s) to attach the top shell 104 and the bottom shell 106 together. In addition, the example collar clip 136 and the EMR shield 138 can simultaneously perform an EMR containment function in conjunction with a receptacle of a host device (not shown) when the module 100 is plugged into the receptacle of the host device. The decal 140 can include data direction indicators 142 and 144 that correspond to the data directions of the TOSA 112 and the ROSA 114, respectively. Specifically, the data direction indicator 142 specifies that the TOSA 112 transmits data out of the output port 108 and the data direction indicator 144 specifies that the ROSA 114 receives data through the input port 110.

The module 100 can be configured for optical signal transmission and reception at a variety of per-second data rates including, but not limited to, 1 Gbit, 2 Gbit, 2.5 Gbit, 4 Gbit, 8 Gbit, 10 Gbit, 16 Gbit or higher. Furthermore, the module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the module 100 can be configured to support various transmission standards including, but not limited to, Optical Fast Ethernet, Optical Gigabit Ethernet, 10 Gigabit Ethernet, 40G Ethernet, 100G Ethernet, and 1×, 2×, 4×, 8×, 10×, and 16× Fibre Channel.

In addition, although one example of the module 100 is configured to have a form factor that is substantially compliant with the SFP+ MSA, the module 100 can alternatively be configured to have a variety of different form factors that are substantially compliant with other MSAs including, but not limited to, the SFF MSA or the SFP MSA. Also, although the example module 100 is configured as an optoelectronic transceiver module configured to transmit and receive optical data signals, the example latching mechanisms disclosed herein can also benefit other modules such as electronic transceiver or transponder modules configured to transmit and receive electrical data signals.

2. Example Latching Mechanism

With continued reference to FIG. 1C, the module 100 also includes an example latching mechanism 200. The example latching mechanism 200 is configured for use in releasably securing the module 100 within a receptacle, such as a cage, of a host device (not shown). The example latching mechanism 200 generally includes a handle 300, a release slide 400, a latch 500, a latch return spring 600, and slide springs 700, each of which will now be discussed in turn.

With continued reference to FIG. 1C, additional aspects of the handle 300 are disclosed. The handle 300 can be formed from a polycarbonate material, for example, though other suitable materials can also be used. The handle 300 may be configured to be rigid enough to generally maintain its shape but also flexible enough to be capable of being manually flexed by a technician, during module extraction for example. The handle 300 is configured to be attached to the release slide 400 via a coupling structure 402 of the release slide 400. For example, the handle 300 may be over-molded around the coupling structure 402. The handle 300 is configured to be manually pulled and pushed in order to slide the release slide 400 back and forth in the z-direction with respect to the bottom shell 106 of the module 100.

Figure 2A:
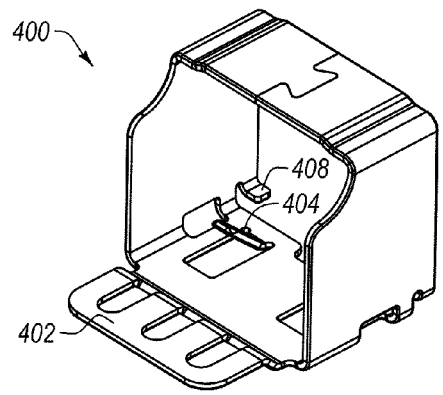
FIG. 2A is a top front perspective view of an example release slide of the example latching mechanism of FIG. 1C.
Figure 2B:
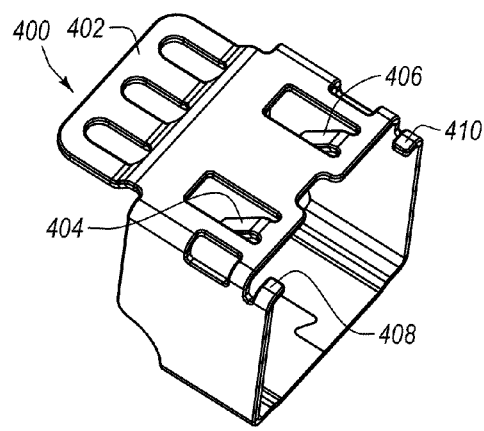
FIG. 2B is a bottom rear perspective view of an example release slide of FIG. 2A.

With reference to FIGS. 1C, 2A, and 2B, additional aspects of the release slide 400 are disclosed. The release slide 400 can be stamped and bent from sheet metal, for example, though other suitable materials can also be used. The release slide 400 generally defines the coupling structure 402, first and second slide ramps 404 and 406, and first and second stop fingers 408 and 410. Although the release slide 400 includes two slide ramps and two stop fingers, it is understood that the release slide 400 may instead include only one slide ramp and/or one stop finger, or may instead include three or more slide ramps and/or three or more stop fingers. The release slide 400 is configured to be slid back and forth in the z-direction with respect to the bottom shell 106 of the module 100.

Figure 2C:
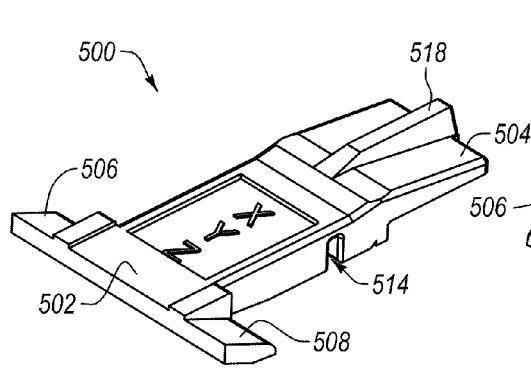
FIG. 2C is a top front perspective view of an example latch of the example latching mechanism of FIG. 1C.
Figure 2D:
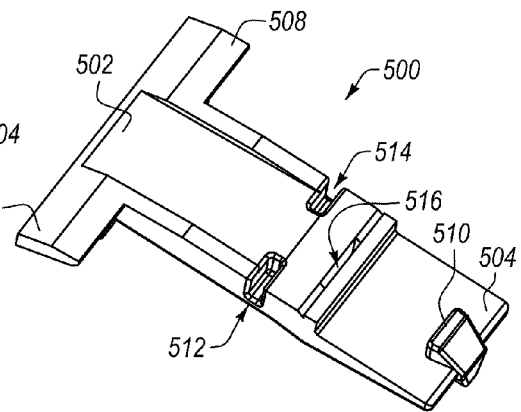
FIG. 2D is a bottom rear perspective view of an example latch of FIG. 2C.

With reference to FIGS. 1C, 2C, and 2D, additional aspects of the latch 500 are disclosed. The latch 500 can be formed from a zinc cast material, but in other embodiments, any suitable material can be employed including, but not limited to, thermoplastics, machined aluminum, other machined materials, or sheet metal. The latch 500 includes a first end 502 and a second end 504, first and second latch arms 506 and 508 defined on the first end 502, and an engagement pin 510 defined on the second end 504. The latch 500 may also define first and second slots 512 and 514, a latch slot 516, and a longitudinal rib 518 opposite the engagement pin 510. The latch 500 is configured to be rotated by the back and forth sliding of the release slide 400, as discussed in further detail below in connection with FIGS. 3A-3C and 4A-4C.

Figure 2E:
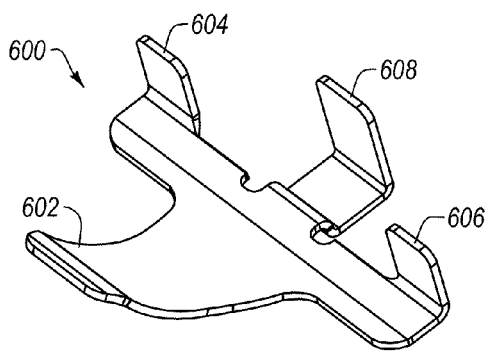
FIG. 2E is a top front perspective view of an example latch return spring of the example latching mechanism of FIG. 1C.
Figure 2F:
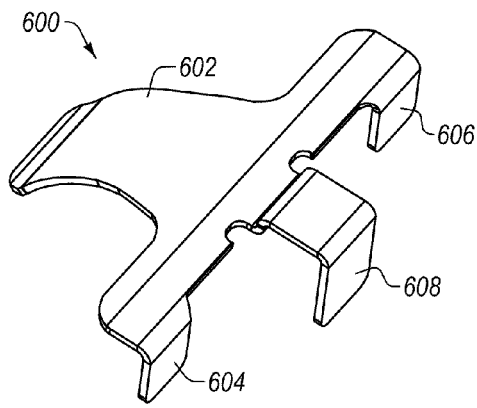
FIG. 2F is a bottom rear perspective view of an example latch return spring of FIG. 2E.

With reference to FIGS. 1C, 2E, and 2F, additional aspects of the latch return spring 600 are disclosed. The latch return spring 600 can be stamped and bent from sheet metal, for example, though other suitable materials can also be employed. The latch return spring 600 includes a leaf spring 602, first and second tabs 604 and 606, and a latch tab 608. It is understood that instead of being configured as a leaf spring, the spring 602 can instead be configured as another type of spring such as a coil spring, for example. The latch spring 600 is configured to bias against the latch 500.

3. Operation of the Example Latching Mechanism

Figure 3A:
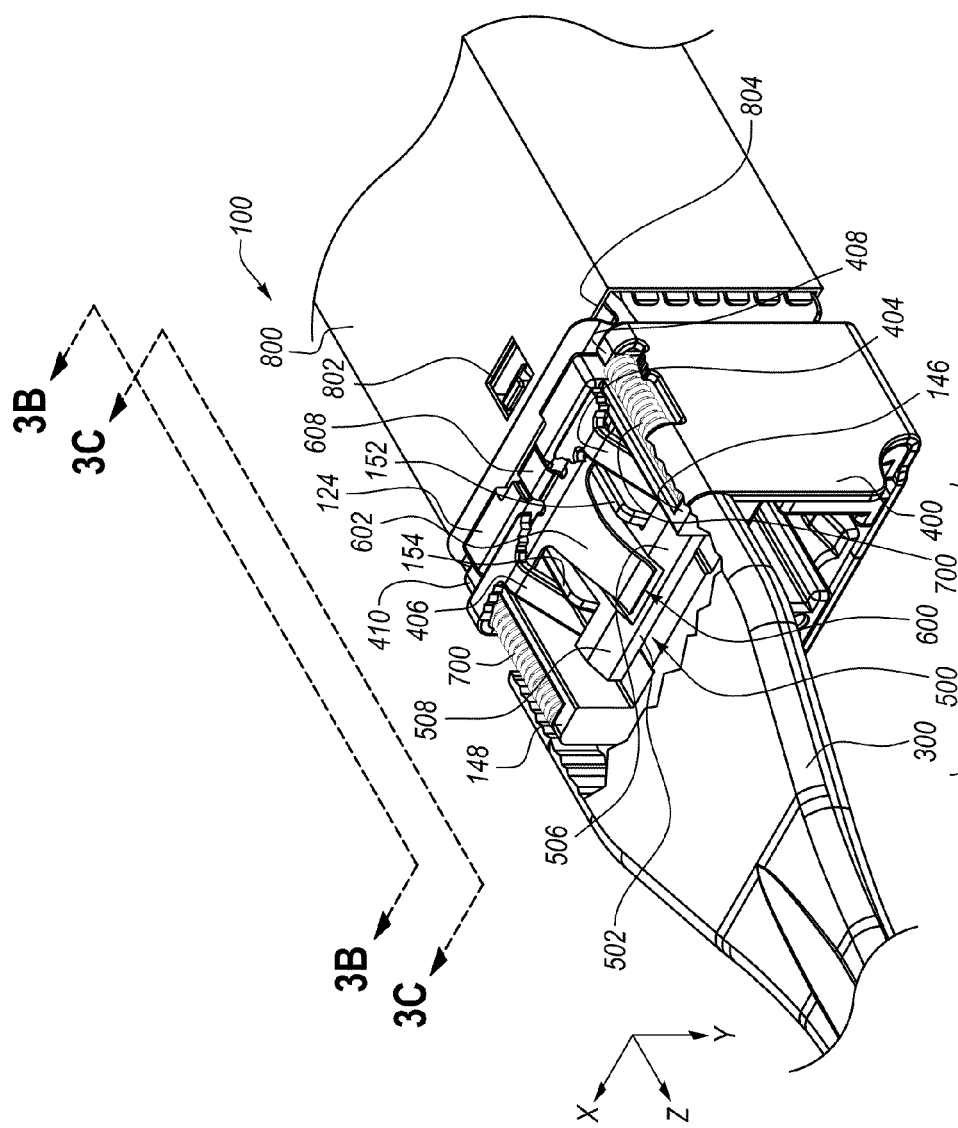
FIG. 3A is a bottom front cut-away perspective view of a portion of the example electronic module of FIG. 1A fully inserted into and latched to an example cage.
Figure 3B:
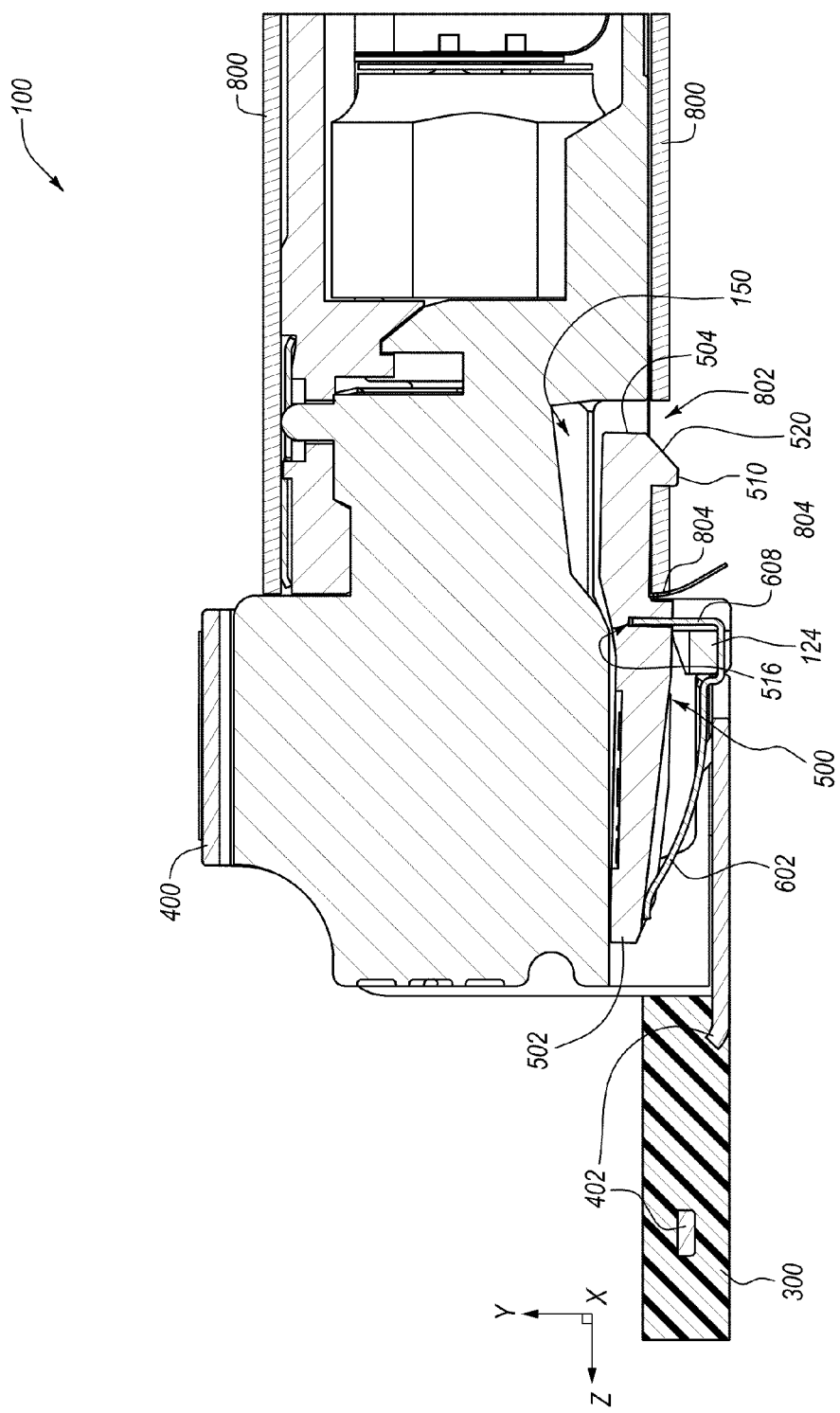
FIG. 3B is a first cross-sectional side view of a portion of the example electronic module of FIG. 3A fully inserted into and latched to the example cage of FIG. 3A.
Figure 3C:
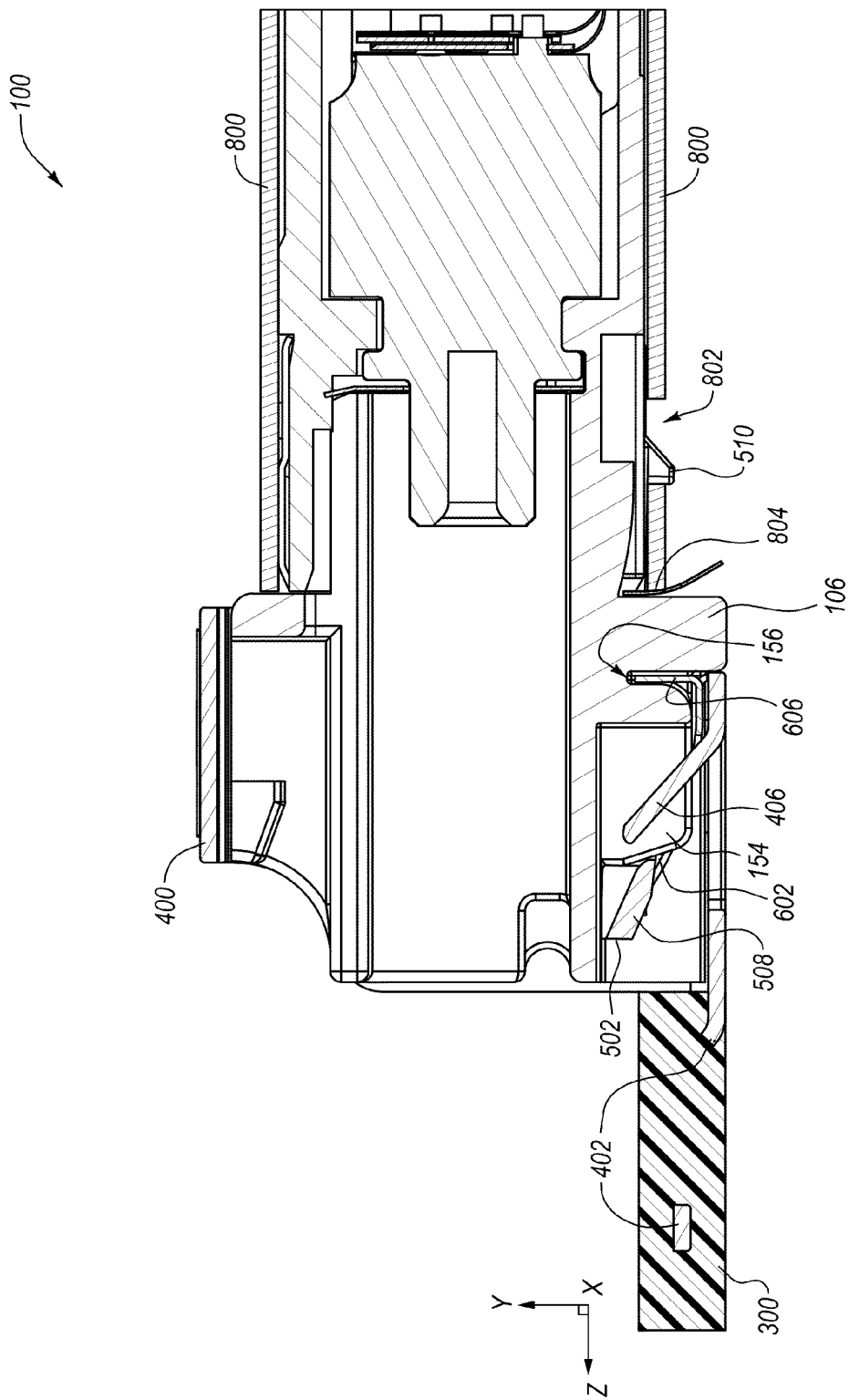
FIG. 3C is a second cross-sectional side view of a portion of the example electronic module of FIG. 3A fully inserted into and latched to the example cage of FIG. 3A.

Turning now to FIGS. 3A-3C and 4A-4C, aspects of the operation of the example latching mechanism 200 are disclosed. FIGS. 3A-3C disclose the module 100 fully inserted into a cage 800 of a host device (not shown) with the latching mechanism 200 in a latched position, and FIGS. 4A-4C disclose the module 100 partially extracted from the cage 800 the latching mechanism 200 in an unlatched position. As used herein, the term "latched position" refers to the positions of the various components of the latching mechanism 200 that result in the engagement pin 510 extending out of the bottom shell 106 of the module 100 and engaging a corresponding structure of a host device, such as an edge of an opening 802 of the cage 800. As used herein, the term "unlatched position" refers to the positions of the various components of the latching mechanism 200 that result in the engagement pin 510 retracted within a latch recess 150 (see FIGS. 3B and 4B) defined in the bottom shell 106 of the module 100 such that the engagement pin 510 does not engage a corresponding structure of a host device, such as the edge of the opening 802 of the cage 800.

As disclosed in FIG. 3A, the slide springs 700 bias against stop tabs 146 and 148 of the bottom shell 106 and the first and second stop fingers 408 and 410 of the release slide, respectively, to automatically maintain the release slide 400 in the latched position. Further, as disclosed in FIGS. 3A and 3B, the leaf spring 602 of the latch return spring 600 biases against the first end 502 of the latch 500 to automatically maintain the latch 500 in the latched position. Also, first and second latch shoulders 152 and 154 defined in the bottom shell 106 are positioned between the first and second slide ramps 404 and 406 and help maintain the latch 500 properly aligned in the x-direction. Also, as disclosed in FIG. 3B, the latch tab 608 is wrapped around the cross bar 124 and partially positioned in the latch slot 516. The cross bar 124 is thus positioned between the latch 500 and at least a portion of the latch tab 608. Further, as disclosed in FIG. 3C, the shell tabs 604 (see FIGS. 2E and 2F) and 606 are positioned in first and second shell slots 156 (only one of which is shown in FIG. 3C).

When the handle 300 is manually pulled, this pulling causes the release slide 400 to slide a distance Dy in the direction of the z-arrow (hereinafter the "positive" z-direction), as disclosed in FIGS. 4B and 4C. As the release slide 400 slides in the positive z-direction, the slide springs 700 are compressed against the stop tabs 146 and 148 of the bottom shell 106 by the first and second stop fingers 408 and 410 of the release slide 400, thus overcoming the spring force of the slide springs 700, as disclosed in FIG. 4A.

Figure 4A:
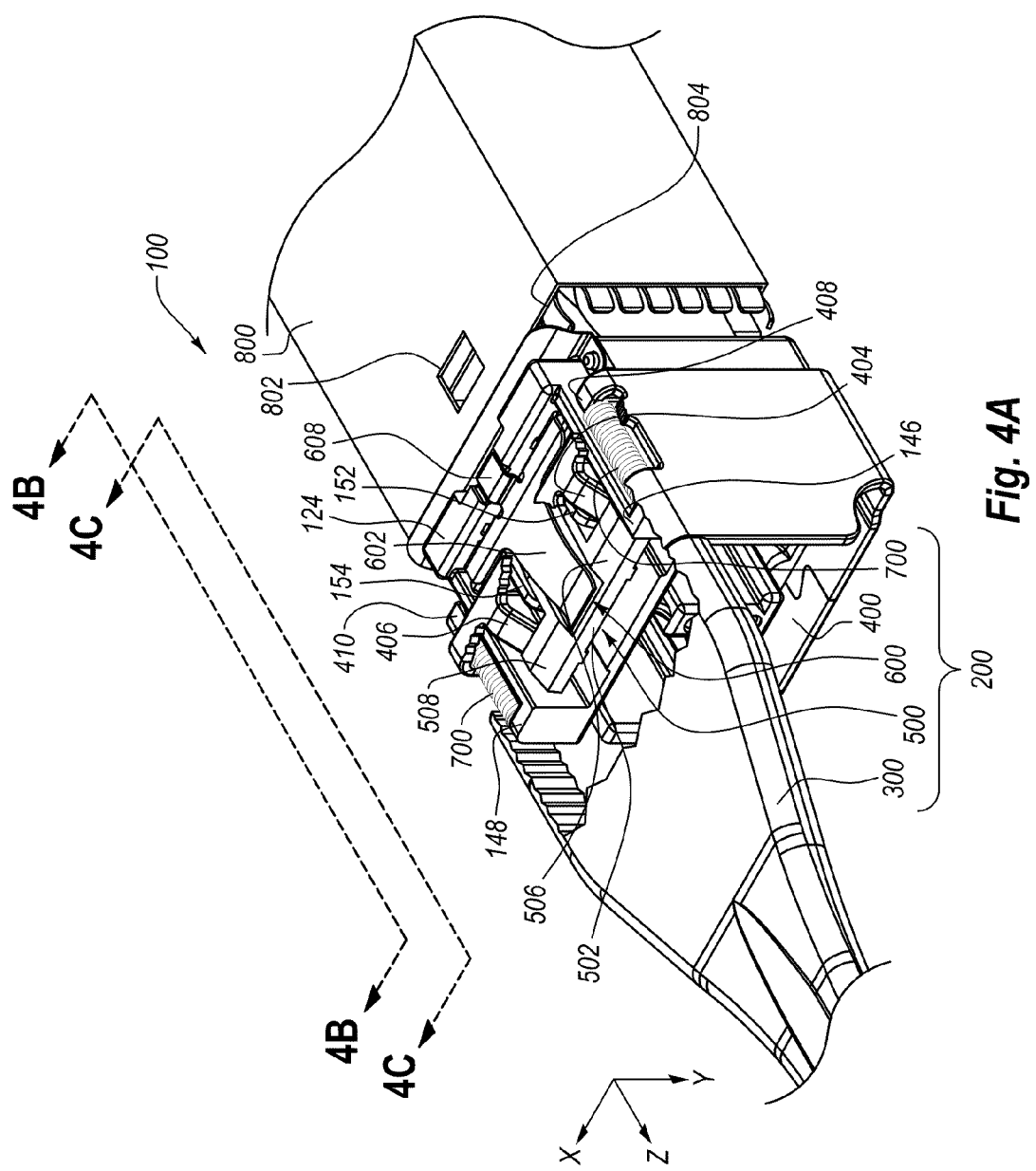
FIG. 4A is a bottom front cut-away perspective view of a portion of the example electronic module of FIG. 1A only partially inserted into and unlatched from the example cage of FIG. 3A.
Figure 4B:
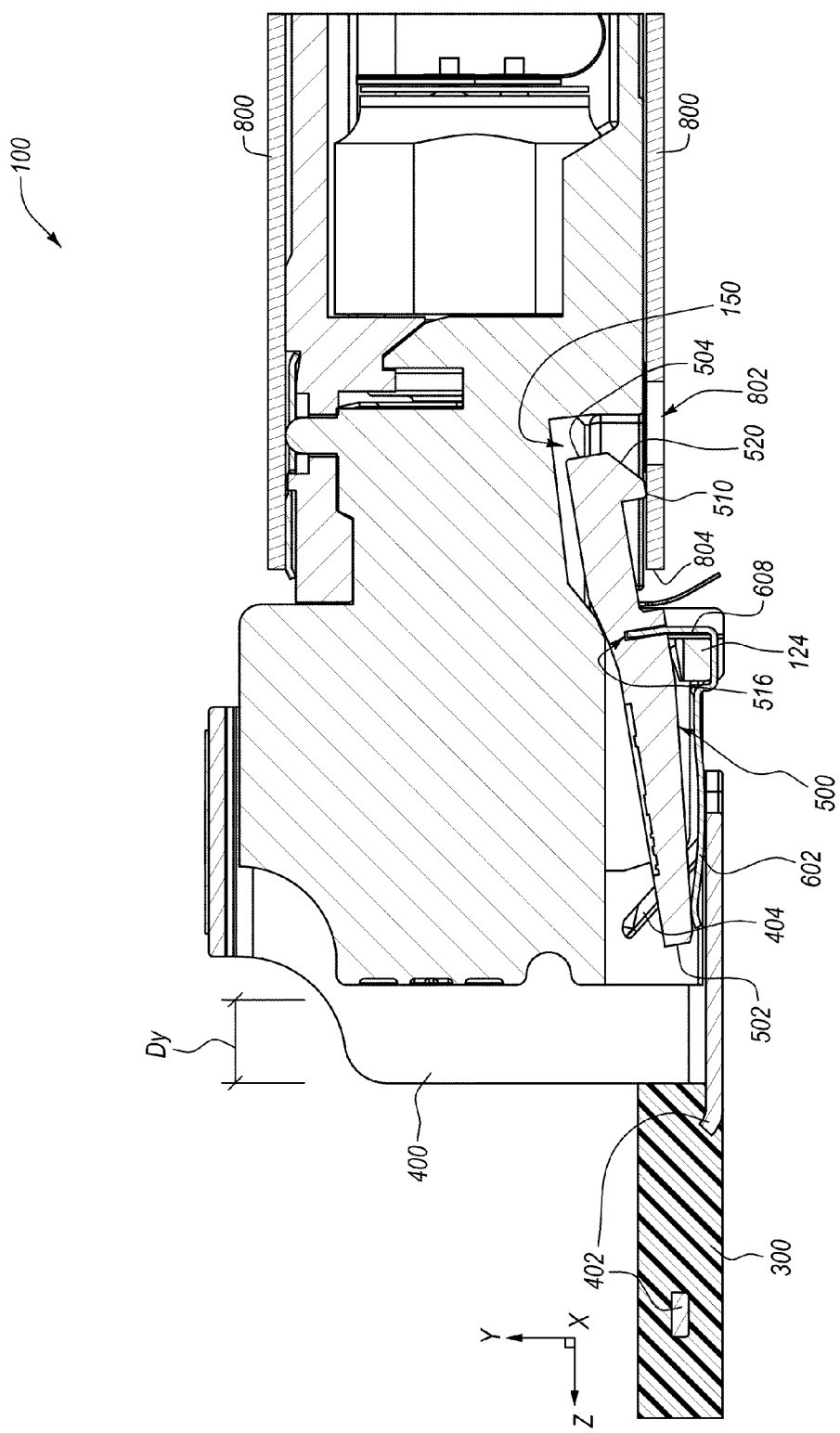
FIG. 4B is a first cross-sectional side view of a portion of the example electronic module of FIG. 4A only partially inserted into and unlatched from the example cage of FIG. 4A.
Figure 4C:
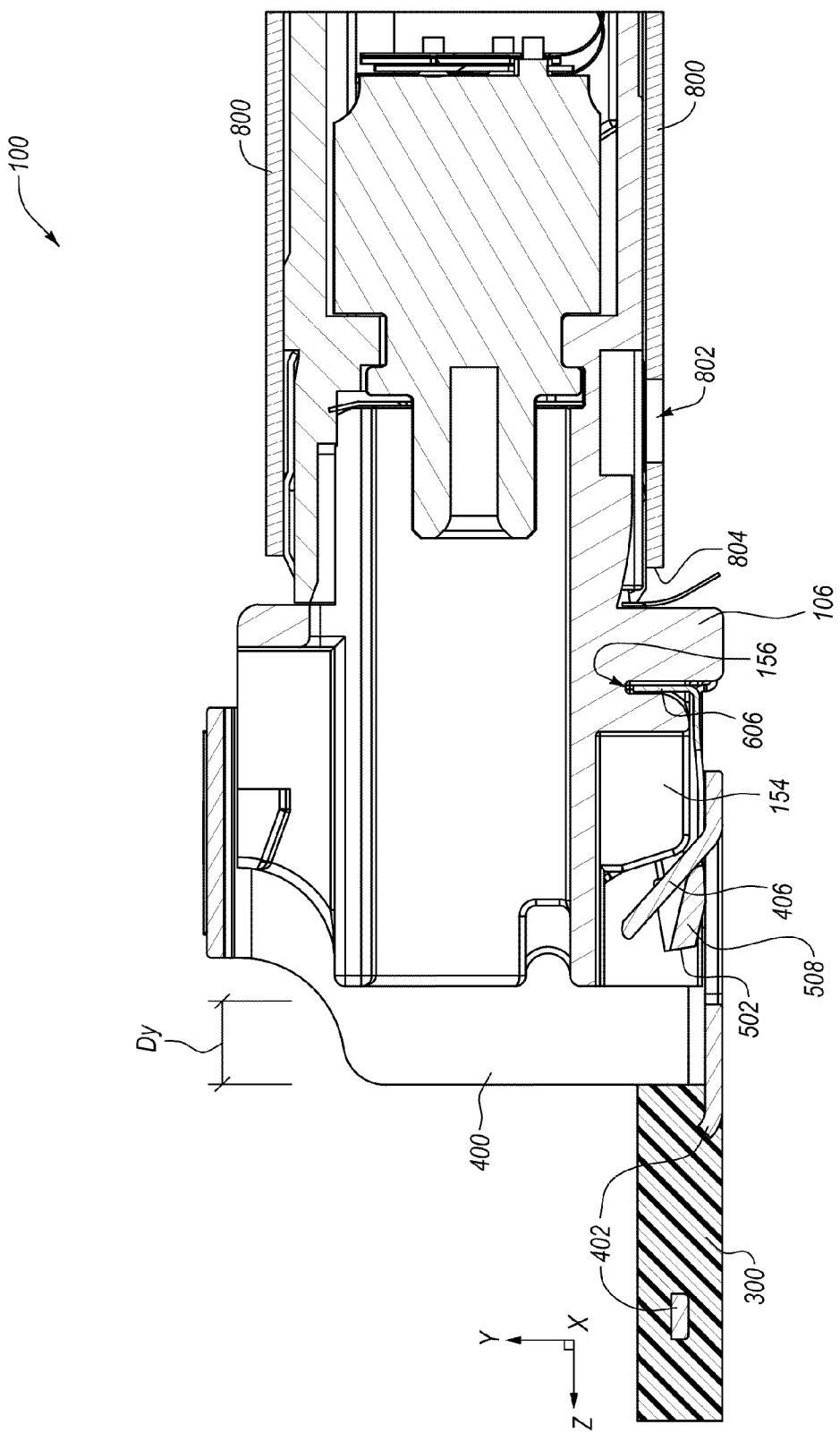
FIG. 4C is a second cross-sectional side view of a portion of the example electronic module of FIG. 4A only partially inserted into and unlatched from the example cage of FIG. 3A.

Further, as disclosed in a comparison of FIGS. 3A and 3C with FIGS. 4A and 4C, respectively, as the release slide 400 slides in the positive z-direction, the slide ramps 404 and 406 are configured to engage and slide along the latch arms 506 and 508, respectively. As the latch arms 506 and 508 slide along the slide ramps 404 and 406, the slide ramps 404 and 406 force the first end 502 of the latch 500 to press against the leaf spring 602 opposite the direction of the y-arrow (hereinafter the "negative" y-direction). Thus, the first end 502 of the latch overcomes the spring force of the leaf spring 602 and finally comes to rest in the position disclosed in FIGS. 4A-4C.

Further, as the first end 502 of the latch 500 is forced in the negative y-direction, the latch 500 rotates about the cross bar 124, which causes the second end 504 of the latch 500 to rotate in the positive y-direction, resulting in the engagement pin 510 disengaging from the edge of the opening 802 of the cage 800 and the second end 504 of the latch 500 being retracted within the latch recess 150 defined in the bottom shell 106, as disclosed in FIG. 4B. Once disengaged and retracted in this way, the module 100 can then be pulled from the cage 800.

Upon release of the handle 300, the combined spring forces of the slide springs 700 and the leaf spring 602 cause the release slide 400 to automatically slide in the negative z-direction back to the original latched position disclosed in FIGS. 3A-3C. Accordingly, the default position of the latch mechanism 200 of the module 100 is the latched position. Therefore, once the module 100 has been fully inserted into the cage 800, the engagement pin 510 automatically engages with the edge of the opening 802 of the cage 800, as disclosed in FIG. 3B It is understood, however, that during module insertion the spring force of the leaf spring 602 of the latch return spring 600 can be overcome without pulling on the handle 300 in order to slide the release slide in the positive z-direction. For example, as the module 100 is being inserted into the cage 800, the ramped surface 520 of the engagement pin 510, disclosed in FIG. 4B, can engage and slide along a substantially rigid leading edge 804 of the cage 800. As the ramped surface 520 slides along the substantially rigid leading edge 804, the second end 504 of the latch 500 is forced in the positive y-direction and the first end 502 of the latch 500 is forced in the negative y-direction, thus overcoming the spring force of the leaf spring 602 of the latch return spring 600. Once the module 100 is inserted fully into the cage 800, as disclosed in FIG. 3B, however, the spring force of the leaf spring 602 will force the first end 502 of the latch 500 in the positive y-direction, which in turns forces the second end 504 of the latch 500 in the negative y-direction and allows the engagement pin 510 to engage an edge of the opening 802 of the cage 800.

Thus, the example latching mechanism 200 disclosed herein assists in both the selective retention of the module 100 within a receptacle of a host device as well as removal therefrom when desired. The latching mechanism 200 is configured so as to retract its engagement pin 510 when the handle 300 is pulled, thus facilitating removal of the module 100 from a receptacle of a host device. Also, the latching mechanism 200 is configured so as to automatically reengage its engagement pin 510 when the handle 300 is released, thus facilitating retention of the module 100 within a receptacle of a host device. Moreover, the latching mechanism 200 is also configured so as to retract its engagement pin 510 without pulling on the handle 300 so as to prevent malfunction as the module 100 is inserted into a receptacle with a substantially rigid leading edge. Further, the handle 300 of the latching mechanism 200 facilitates relatively easy insertion and extraction of the module 100, even in high density host devices. In particular, while it may be relatively difficult to extra modules having traditional bail latching mechanisms in high density host devices, the handle 300 of the module 100 is relatively easy to access even when tightly surrounded by other modules.

The example embodiments disclosed herein may be embodied in other specific forms. The example embodiments disclosed herein are to be considered in all respects only as illustrative and not restrictive.

What is claimed is:

1. A latching mechanism for an electronic module, the latching mechanism comprising:
   a latch configured to rotate between a latched position and an unlatched position, the latch comprising:
      first and second latch arms on a first end of the latch; and
      an engagement pin on a second end of the latch;
   a latch return spring configured to bias the latch in the latched position; and
   a release slide comprising first and second slide ramps configured to engage the first and second latch arms, respectively, as the release slide is slid away from the engagement pin, which causes the latch to rotate from the latched position to the unlatched position, the first and second slide ramps comprising substantially flat tabs that are angled with respect to the portion of the release slide to which the substantially flat tabs are attached.

2. The latching mechanism as recited in claim 1, wherein:
   the latch defines a latch slot; and
   the latch return spring defines a latch tab that is configured to be at least partially positioned in the latch slot.

3. The latching mechanism as recited in claim 1, wherein the engagement pin defines a ramped surface that faces away from the first end of the latch.

4. The latching mechanism as recited in claim 1, further comprising a slide spring configured to bias the release slide toward the engagement pin.

5. The latching mechanism as recited in claim 1, further comprising a handle attached to the release slide, the handle configured to be manually pulled in order to slide the release slide away from the engagement pin.

6. An electronic module comprising:
   a shell defining a cross bar; and
   a latching mechanism comprising:
      a latch configured to rotate about the cross bar between a latched position and an unlatched position, the latch defining a latch slot, the latch comprising:
         a latch arm on a first end of the latch; and
         an engagement pin on a second end of the latch;
      a release slide comprising a slide ramp configured to slide along the latch arm as the release slide is slid away from the engagement pin, which causes the latch to rotate from the latched position to the unlatched position; and
      a latch return spring configured to bias the latch in the latched position, the latch return spring defining a latch tab that is at least partially positioned in the latch slot.

7. The electronic module as recited in claim 6, wherein the cross bar is positioned between the latch and at least a portion of the latch tab.

8. The electronic module as recited in claim 6, wherein the latching mechanism further comprises first and second slide springs configured to bias the release slide toward the engagement pin.

9. The electronic module as recited in claim 8, wherein the shell further defines a latch recess configured to receive the second end of the latch when the latch is rotated into the unlatched position.

10. The electronic module as recited in claim 6, wherein:
the latch further comprises a second latch arm on the first end of the latch; and
the release slide further comprises a second slide ramp configured to slide along the second latch arm as the release slide is slid away from the engagement pin, which causes the latch to rotate from the latched position to the unlatched position.

11. The electronic module as recited in claim 10, wherein the shell further defines first and second latch shoulders positioned between the slide ramp and the second slide ramp.

12. An electronic module comprising:
a shell defining a cross bar and first and second shell slots; and
a latching mechanism comprising:
a latch configured to rotate about the cross bar between a latched position and an unlatched position, the latch comprising:
first and second latch arms defined on a first end of the latch; and
an engagement pin defined on a second end of the latch;
a latch return spring configured to bias against the first end of the latch to maintain the latch in the latched position, the latch return spring defining first and second shell tabs that are at least partially positioned in the first and second shell slots, respectively;
a release slide comprising first and second slide ramps configured to engage the first and second latch arms, respectively, as the release slide is slid away from the engagement pin, which causes the latch to rotate from the latched position to the unlatched position;
first and second slide springs configured to bias the release slide toward the engagement pin; and
a handle attached to the release slide, the handle configured to be manually pulled in order to slide the release slide away from the engagement pin.

13. The electronic module as recited in claim 12, wherein the shell further defines first and second latch shoulders positioned between the first and second slide ramps.

14. The electronic module as recited in claim 12, wherein the latch return spring comprises a leaf spring.

15. The electronic module as recited in claim 12, wherein the first and second slide springs comprise coil springs.

* * * * *